US012052353B2

(12) United States Patent
Jäger et al.

(10) Patent No.: US 12,052,353 B2
(45) Date of Patent: Jul. 30, 2024

(54) METHOD FOR SECURING A DATA EXCHANGE IN A DISTRIBUTED INFRASTRUCTURE

(71) Applicant: UNISCON UNIVERSAL IDENTITY CONTROL GMBH, Munich (DE)

(72) Inventors: Hubert Jäger, Pullach (DE); Christos Karatzas, Munich (DE); Sibi Antony, Munich (DE); Jaro Fietz, Rampe (DE); Moritz Uehling, Karlsruhe (DE)

(73) Assignee: UNISCON UNIVERSAL IDENTITY CONTROL GMBH, Munich (DE)

( * ) Notice: Subject to any disclaimer, the term of this patent is extended or adjusted under 35 U.S.C. 154(b) by 888 days.

(21) Appl. No.: 17/091,323

(22) Filed: Nov. 6, 2020

(65) Prior Publication Data
US 2021/0105136 A1   Apr. 8, 2021

Related U.S. Application Data

(63) Continuation of application No. PCT/EP2019/061875, filed on May 8, 2019.

(30) Foreign Application Priority Data

May 8, 2018   (DE) ..................... 10 2018 111 081.2

(51) Int. Cl.
*H04L 9/08*   (2006.01)
*H04L 9/32*   (2006.01)
(52) U.S. Cl.
CPC .......... *H04L 9/0861* (2013.01); *H04L 9/0825* (2013.01); *H04L 9/0894* (2013.01); *H04L 9/3263* (2013.01)

(58) Field of Classification Search
CPC ... H04L 9/0861; H04L 9/0825; H04L 9/0894; H04L 9/3263; H04L 2209/805; H04L 9/085; H04L 9/0816
See application file for complete search history.

(56) References Cited

U.S. PATENT DOCUMENTS 6,987,855 B1   1/2006   Srivastava
2006/0023887 A1   2/2006   Agrawal et al.
(Continued)

OTHER PUBLICATIONS

International Search Report issued for corresponding International Patent Application No. PCT/EP2019/061875, mailed on Nov. 12, 2019.
(Continued)

*Primary Examiner* — Bruce S Ashley
(74) *Attorney, Agent, or Firm* — Myers Wolin, LLC

(57) ABSTRACT

A method is provided for enabling a secure data exchange between a number of nodes of a network of nodes, wherein each node has identical cryptographic key pairs for encrypting the data exchange, wherein the key pairs are generated by the respective nodes themselves and automatically. The addition of nodes to a network of nodes takes place with the aid of a temporary public key which is generated by the node to be added and which has to be verified by trustworthy entities. After successful verification, the cryptographic key pair required for the data exchange is made available to the node to be added. After the new node has been added, all nodes of the network again have identical cryptographic key pairs for the encrypted data exchange.

6 Claims, 2 Drawing Sheets

(56) References Cited

U.S. PATENT DOCUMENTS

| | | |
|---|---|---|
| 2006/0233364 A1 | 10/2006 | Camenisch |
| 2012/0324218 A1 | 12/2012 | Duren et al. |
| 2013/0243194 A1 | 9/2013 | Hawkes et al. |
| 2016/0182233 A1 | 6/2016 | Go et al. |
| 2017/0213218 A1* | 7/2017 | Pickering .............. G06K 19/145 |

OTHER PUBLICATIONS

Adi Shamir "How to Share a Secret" IP.com Journal, Electronic Publication, Mar. 30, 2007, IP.com, INC., West Henrietta, NY, USA.

Choi, D. et al. "Efficient and Secure Self-Organized Public Key Management for Mobile Ad Hoc Networks" IEICE Transactions on Communications, Nov. 2008, pp. 3574-3583, vol. E91-B, No. 11, The Institute of Electronics, Information and Communication Engineers.

Menezes, A. et al., "Chapter 13: Key Management Techniques ED," Handbook of Applied Cryptography, Oct. 1, 1996, pp. 543-590, CRC Press, Boca Raton, FL, US; Retrieved from the Internet: http://www.cacr.math.uwaterloo.ca/hac/.

Examination report under sections 12 & 13 of Patents Act, 1970 and the Patents Rules, 2003 issued by The Patent Office of India for Indian Patent Application No. 202017052939, mailed on Sep. 1, 2023.

First Office Action issued by the Chinese Patent Office for Chinese Patent Application No. 201980045809.7, dated Feb. 1, 2024.

Search Report issued by the Chinese Patent Office for Chinese Patent Application No. 2019800458097, dated May 8, 2019.

\* cited by examiner

METHOD FOR SECURING A DATA EXCHANGE IN A DISTRIBUTED INFRASTRUCTURE

CROSS REFERENCE TO RELATED APPLICATIONS

This application is a continuation of International Application No. PCT/EP2019/061875, filed on May 8, 2019, which takes priority from German Application No. 10 2018 111 081.2, filed on May 8, 2018, the contents of each of which are incorporated by reference herein.

TECHNICAL FIELD

The invention relates to a method for enabling a secure data exchange in a distributed infrastructure. In this case, a distributed infrastructure is a network of computers or servers, which may be physically separated from each other and connected via a communication network. The individual computers or servers are referred to in this context as a network of nodes. Each network of nodes may consist of one or more computers. Below, the term "node" is used to refer to a computer, a server or a group of computers in a network.

BACKGROUND

To ensure a secure data exchange between a plurality of nodes in a network, the data exchange is often encrypted. Each node generates a cryptographic key pair with a private key and a public key. The private key remains with the node where it was generated and is stored there. The public key is transmitted or distributed to the other nodes of the network using known key exchange methods. The other nodes of the computer network can then use this public key to encrypt the transmission of data to the one node or the data itself.

The disadvantage here, however, is, that each node of the computer network generates its own key pair so that each node has to exchange public keys with all the other nodes of the network (or at least with those nodes of the network with which data is to be exchanged). Thus, in a network with n nodes, n different key pairs would be generated. If each node is to exchange data securely with every other node of the network, each node must provide its public key to all the other nodes of the network, so up to $n^2-n$ key exchanges must be performed, which requires a considerable amount of time and resources.

In addition, for a data transmission from a first node to a second node in the computer network, the first node must select the correct public key assigned to the second node in order to encrypt the data to be transmitted to the second node in a manner that is decryptable. To this purpose, considerable resources must be provided or implemented in the nodes to ensure that the data to be transmitted is correctly encrypted for the respective recipient node at all times, i.e., the respective correct public key is used for the encryption.

A further disadvantage arises when a renewal of the key pair is necessary in a node of the network. In this case, the corresponding public key must be distributed to all the other nodes of the network or made available to all the other nodes. This so-called key update can take a considerable amount of time, so data can only be transmitted to the node that generated the key pair in an encrypted manner when the key update is complete. During the key update, no data can be transmitted to this node, so the other nodes use the old, and therefore the wrong, public key to encrypt the data during the key update.

If the key or the key replacement is provided with a digital certificate, the delay for issuing the corresponding certificate adds to this delay, so the key exchange takes correspondingly more time, which means that even longer down times must be accepted.

Therefore, it is an object of the invention to provide a method with which a secure data exchange is made possible in a distributed infrastructure consisting of a number of nodes without having to accept the disadvantages pertaining to the management of the keys known from the prior art.

SUMMARY

This object is achieved by a method according to the independent claim. Advantageous configurations of the method are described in the dependent claims.

What is thus provided is a method for making it possible to secure a data exchange between a number of nodes of a network of nodes, wherein
  each node is provided with at least two secrets and
  using the respective secrets made available and a key generation algorithm, a cryptographic key pair is automatically generated in each node,
    wherein the secrets and the key generation algorithm made available to the nodes are selected such that identical cryptographic key pairs are generated in each node, and
    wherein the generation of the cryptographic key pair takes place in a secure memory and/or processing area of the node, and at least the private key of the cryptographic key pair is exclusively stored in the secure memory area.

It is advantageous if the secure memory and/or processing area is designed in such a way that it only contains volatile memory media.

It is also advantageous if the generation of the cryptographic key pair is performed by a software module that is executed in the secure memory and/or processing area.

The at least two secrets can each be made available to the nodes by a trustworthy entity.

The trustworthy entities may be persons.

It is advantageous if each node can be generated by a master node.

It is also advantageous if, using the respective secrets made available, each node generates a master secret with which the cryptographic key pairs are generated, with the secrets being generated by the master node in such a way that the master secret can be generated from different but equally large subsets of the secrets.

What is furthermore provided is a method for adding a node to a network of nodes, which is preferably configured as described above, wherein
  the node to be added (slave) generates a temporary cryptographic key pair,
  the public key of the temporary cryptographic key pair is signed by a number of entities, each signing being performed with a private key assigned to the respective entity,
  at least a predetermined number of the certificates generated by the signing is transmitted to a master node of the network and
  the master node checks the received certificates and, if the check is successful, transmits a second cryptographic key pair generated in the master node to the node to be added.

It is advantageous if the second cryptographic key pair is encrypted with the temporary public key prior to the transmission.

When checking the certificates, it is possible to determine whether the received certificates are verifiable and whether at least a predetermined number of verifiable certificates have been transmitted.

The second cryptographic key pair can be used to handle an encrypted data exchange between the node to be added and the other nodes of the network.

BRIEF DESCRIPTION OF THE DRAWINGS

The details and the features of the invention as well as individual embodiments of the invention are provided in the following description in conjunction with the drawing, but the invention is not limited to the embodiments described below. The figures show the following.

DETAILED DESCRIPTION

Figure 1:
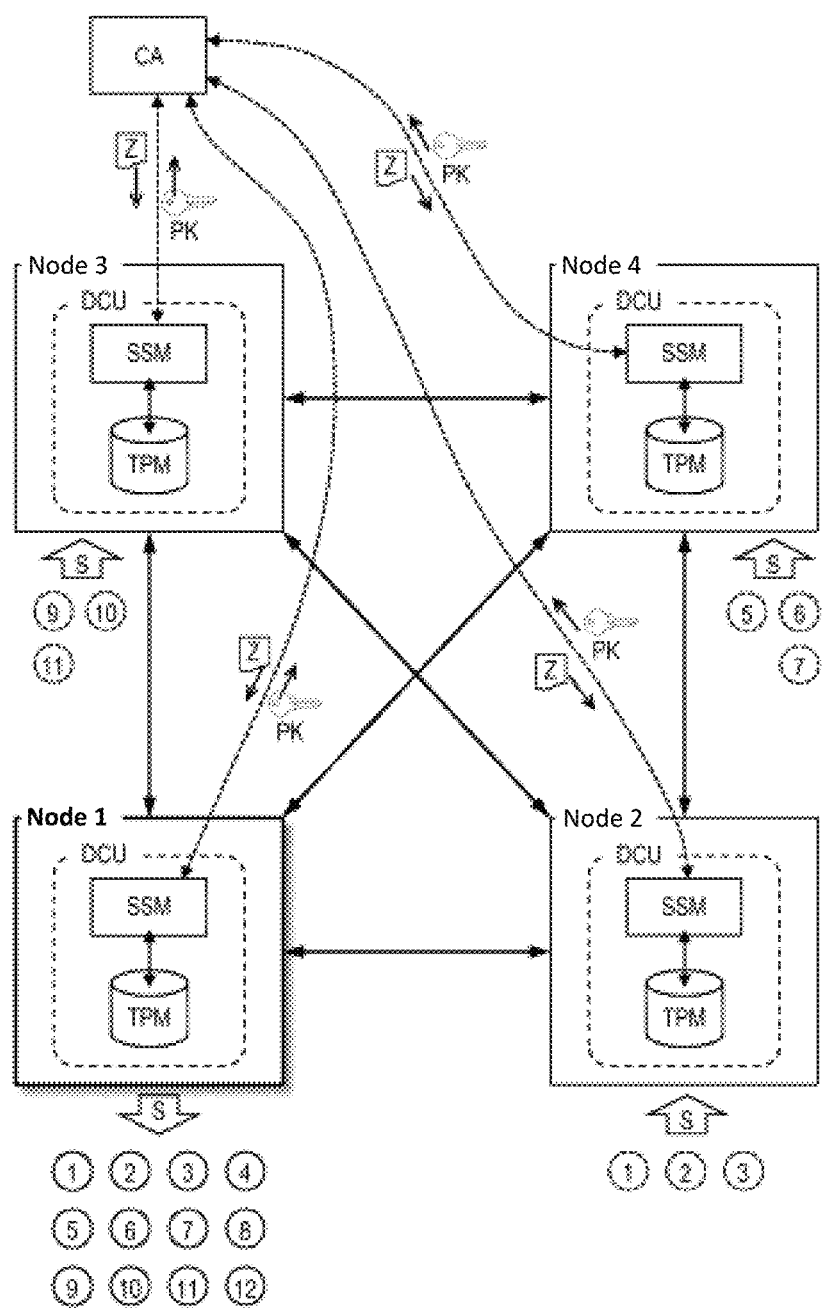
FIG. 1 is an embodiment with four nodes of a network, on the basis of which a variant of the method according to the invention is described

According to the invention, it is provided that each node in a network generates identical cryptographic key pairs consisting of a private key and a public key. This ensures that all nodes of the network can use the same public key for a secure data exchange, regardless of the node for which the data is to be encrypted. A major advantage is that no measures need to be taken in the individual nodes to ensure that a node uses the correct public key of the other node for an encrypted communication with another node of the network.

When configuring the network for the first time, it is only important to ensure that all nodes participating in the network have the appropriate permission, i.e., they are permitted to "participate" in the network. In this context, "participate" means that the nodes can or may carry out an encrypted data exchange among themselves.

When a new node is added to the network, it is only important to ensure that this new node has the appropriate permission as well.

These two operations, i.e., the verification of the permission when the network is configured for the first time and the verification of the permission when a new node is added to the network, only have to be performed once so that no idle time or down time arises due to new/changed keys during operation of the network.

Although all nodes have identical key pairs, these must be newly generated in the node according to the invention. This is because a distribution of the private key from one node to the other nodes of the network, which is needed to decrypt data encrypted with the public key, is prevented according to the invention. This means that the private key cannot leave the node in which it was generated. For this purpose, the nodes are adapted according to the invention in such a way that the respective private key does not have to leave the secure area of the node, the so-called Data Cleanup Area. To ensure this, the decryption of the data is exclusively carried out in this Data Cleanup Area. The key pair is also generated exclusively in the Data Cleanup Area.

According to the invention, it is provided that identical key pairs are newly generated in each node. To ensure that identical key pairs are generated in each node, the same secret is used in each node to generate the cryptographic key pair. In addition, the same cryptographic method (key generation algorithm) is used in each node to generate the cryptographic key pair. A large random number can be provided as a secret, which is made available to each node to generate the cryptographic key pair. This way, the private key does not have to leave the node, while at the same time it is ensured that each node can encrypt data for every other node in the network (using its own generated public key). A positive side effect is that the public keys no longer have to be exchanged, which also significantly reduces the risk of calculating the corresponding private key from a public key.

The secret itself can be generated by a marked node of the network and provided by this marked node to the other nodes. The marked node is also called a master node below. The secret can also be exchanged with the other nodes in an encrypted manner. For the purpose of an encrypted exchange of the secret, each node, with the exception of the master node, which generates the secret and therefore knows it, can generate a temporary cryptographic key pair consisting of a temporary private key and a temporary public key. Each node then informs the master node of its public key so that the master node can encrypt the secret with the respective public key and transmit the encrypted secret to the respective node. The encrypted secret can then be decrypted by the respective node using its private key to generate the cryptographic key pair. Since the temporary cryptographic key pair is only needed for the (one-time) secure transmission of the secret, the temporary cryptographic key pair can be destroyed or deleted afterwards.

An alternative, even more secure method for exchanging the secret is described in connection with FIG. 1. This method described in connection with FIG. 1 has the additional advantage that the nodes must be provided with a plurality of secrets with which the respective node generates the key pair. This prevents a single entity, for example a single person, from generating a key pair in a node or causing the node to generate the key pair because a single entity is only in possession of one of a plurality of secrets.

Although it is also possible to generate a key pair with this single secret, this secret would not be accepted by the other nodes, or the other nodes would use a public key that does not match the private key, ultimately making an incorrectly generated key pair useless.

Alternatively, the secret can also be generated outside the network. If doing so, it must be ensured, however, that each node is provided with such secrets that result in identical keys when the cryptographic key pairs are generated.

The method described so far already ensures a high level of security during the data exchange. This security is further enhanced by the fact that the public keys used for encrypting the data transmission no longer need to be exchanged.

Overall, the highest possible level of security is achieved because the key pairs are automatically generated exclusively in a Data Cleanup Area of the respective node, the data encryption is preferably performed exclusively in the Data Cleanup Area so that the public key does not have to leave the Data Cleanup Area when the network is in operation, the decryption of the data is performed exclusively in the Data Cleanup Area so that the public key does not have to leave the Data Cleanup Area, for the generation of the key pair and thus also the respective private key, a plurality of secrets is necessary, said secrets being distributed on a plurality of secret carriers, so that a single entity cannot generate the key pair required in the network alone or cause the node to generate such a key pair alone.

After each node has generated a cryptographic key pair with the help of the secret, each node of the network can, in principle, handle an encrypted data exchange with all the other nodes of the network, with each node being able to use the same public key to encrypt the data independently of the addressee.

The trustworthiness of the individual nodes is ensured by the fact that a node can only be in possession of the public key required for the encryption if said node has generated the cryptographic key pair with the help of the secret itself, with the secret itself being exchangeable in an encrypted manner or, according to the method described in FIG. 1, being distributable to a plurality of secret carriers, which must then provide their secrets to the respective node.

In order to further increase or improve the trustworthiness, it may be provided according to the invention that each node requests a corresponding digital certificate (public key certificate) from a trustworthy certification authority for its generated public key, with which the ownership and other properties of the respective public key are verified. For this purpose, the public key only has to be made available to the trusted certification authority once. The digital certificate issued by the trusted certification authority is then transferred to the respective node and can be stored there. As a result, a node in the network can then authenticate itself to the other nodes with its own certificate before exchanging encrypted data with other nodes in the network. The public key itself does not have to be transmitted.

With the help of the certificate, it is thus prevented that a node, should it have obtained the cryptographic key pair in an unauthorized manner, can perform an encrypted data exchange with the other nodes of the network since the cryptographic key pair alone is not sufficient for this purpose. With suitable organizational measures, it is possible to prevent the issuing of certificates with which a false identity of the node could be faked, for example, in that a qualified certificate can only be issued by an accredited certification authority and only upon presentation of an official identification document. This data is stored in the certificate so that the other nodes can check this data and only allow encrypted communication if the certificate is valid from their point of view.

Above, the initial configuration and/or setup of a network consisting of a plurality of nodes has been described. The addition of one or more additional nodes to an existing network is described in connection with FIG. 2.

FIG. 1 shows a block diagram of a network with four nodes on the basis of which a variant of the method according to the invention is described.

It should be noted that the method according to the invention can also be used for networks with more than four nodes or with less than four nodes.

According to the invention, a secure, i.e., encrypted data exchange is to be made possible in the network, which consists here of the four nodes 1 to 4. The communication channels through which the encrypted data exchange is to be handled are shown in FIG. 1 with bold double arrows. Accordingly, in the example shown in FIG. 1, each node should be able to exchange encrypted data with each other node. Node 1 is a so-called master node whose functionality is explained below.

Each of the four nodes 1 to 4 has a Sealing Software Module SSM, which is adapted to create a cryptographic key pair PK consisting of a private key and a public key with the help of a secret S. As explained above, all nodes generate identical cryptographic key pairs.

The Sealing Software Module SSM is part of a so-called secure memory area DCU, which is also called a Data Cleanup Area. The Sealing Software Module SSM itself is exclusively executed in the Data Cleanup Area DCU. It is also provided that the cryptographic key pairs generated by the Sealing Software Module SSM are exclusively stored in the Data Cleanup Area DCU and that the encryption and/or decryption of data is also exclusively performed in the Data Cleanup Area DCU. This means that the key pair does not have to leave the Data Clean Up Area DCU, effectively preventing a misuse of the key pair.

The Data Cleanup Area DCU is configured in such a way that, in the event of an unauthorized access to the Data Cleanup Area, all data stored there, especially data stored there without encryption and the key pair, will be deleted. The Data Cleanup Area is characterized, in particular, by the fact that no persistent storage media is present. This measure ensures that if the power supply to the Data Cleanup Area DCU is interrupted (for example, if an unauthorized access to the Data Cleanup Area is detected),

- no unencrypted data can leave the Data Cleanup Area DCU,
- no more data is present in the Data Cleanup Area DCU and
- the key pair stored exclusively in the Data Cleanup Area DCU is deleted since only volatile types of storage media are used.

By means of redundant Data Cleanup Areas in the node, the cryptographic key pairs can be secured so that, for example, after a power interruption in the Data Cleanup Area, the cryptographic key pair can be restored from a replicated Data Cleanup Area. Communication between redundant Data Cleanup Areas is advantageously encrypted as well.

The Trusted Platform Modules TPM shown in nodes 1 to 4 can likewise be part of the respective Data Cleanup Area DCU. Alternatively, but not recommended, the Trusted Platform Modules TPM can also be located outside the respective Data Cleanup Area DCU with the data being preferably exchanged in an encrypted form between the Trusted Platform Module and the Data Cleanup Area DCU.

To allow for the Sealing Software Modules SSM of the individual nodes 1 to 4 to generate an identical key pair each, it may be provided, as explained above, that the master node 1 generates a secret S and passes this secret, preferably encrypted, to the other nodes 2 to 4, which then generate the respective key pair with the help of this secret.

In the embodiment shown in FIG. 1, the secret S is generated by the master node. However, the secret S is not transmitted directly to the other nodes 2 to 4 but is distributed to a plurality of secret carriers. Each secret carrier is thus in possession of a part of the secret S (also called a partial secret).

In the example shown in FIG. 1, 12 secret carriers are provided on which the secret S generated by the master node is distributed. The generation of the secret S and the distribution of the secret S to the plurality of secret carriers is performed in such a way that a certain subset of secret carriers is needed to reconstruct the secret S, i.e., only some of the partial secrets are needed to reconstruct the secret S. According to the example shown in FIG. 1, the secret S can be reconstructed on the basis of the partial secrets of three secret carriers. The Shamir Secret Sharing Method can be used to split and reconstruct the secret.

According to the invention, it is provided that the secret S is divided between at least two secret carriers and that the at least two partial secrets are necessary for the reconstruction of the secret. This effectively ensures that at least two secret carriers, usually particularly trustworthy persons, are necessary to cause a node to generate a valid key pair.

After the master node has distributed the created secret S to the secret carriers 1 to 12, the secret carriers 1 to 3 go to node 2, the secret carriers 5 and 6 to node 4 and the secret carriers 9 to 11 to node 3.

The secret carriers 1 to 3 make their partial secrets available to node 2, i.e., the Sealing Software Module SSM of node 2, so that the Sealing Software Module SSM of node 2 can first reconstruct the secret S from the partial secrets and then use the secret S to generate the cryptographic key pair. Nodes 3 and 4 do the same with the partial secrets of the secret carriers 9 to 11 and 5 to 7, respectively.

To ensure a secure output of the secret by the master node or a secure input of the partial secrets by the secret carriers, the nodes provide a secure interface. Via this interface, the secret or the partial secrets are transmitted for the reconstruction of the secret in an encrypted manner. For this purpose, the respective nodes or the Sealing Software Module SSM of the respective nodes can generate a temporary key pair with which the data to be output or input is encrypted.

After the nodes 1 to 4 have generated the respective cryptographic key pair, each of the nodes initiates a certification of its respective public key PK by a Certification Authority CA. To this purpose, the respective public key PK is transmitted to the Certification Authority CA (which can also be done in an encrypted manner). The Certification Authority CA generates a corresponding digital certificate Z (public key certificate) and transmits the same to the respective node. The public key transmitted to the Certification Authority CA can be deleted there. According to the invention, the public key PK only has to leave the node in which it was generated once, namely to have a certificate generated by the Certification Authority CA. For the encrypted data exchange with the other nodes, the public keys do not have to be exchanged since all nodes generate identical key pairs and thus also identical public keys PK. The certificate itself can, in turn, be stored in the respective Data Cleanup Area DCU.

As already mentioned, a node no longer needs to be provided with the public key of another node in order for the node to encrypt data for the other node. In particular, the nodes do not have to provide measures to ensure that the correct public key is used for the encrypted communication with the other nodes. This is especially advantageous when several thousand nodes are involved in the network. This advantage becomes impressively clear when a new node is added to a network consisting of several thousand nodes. In this case, the public key would have to be distributed to all other nodes of the network in a complex manner so that these other nodes could communicate with the new node in an encrypted manner.

To further increase security, it is intended that a node must identify itself to the other nodes as a trusted node before this node can handle encrypted data exchange with the other nodes. For this purpose, the certificate Z that the nodes requested from the Certification Authority for their respective public key PK is used. For example, before node 3 transmits encrypted data to node 4 using the public key PK, node 3 must transfer its certificate Z to node 4. Then, node 4 can check the certificate Z and then allow the communication if the certificate is recognized as valid. It is advantageous here if a qualified certificate is issued by the Certification Authority CA and only upon presentation of an official identification document (for example, that of a responsible manager of the node operator). This data is stored in the certificate so that the other nodes can check this data. The other nodes therefore only have to check whether the certificate was issued by an approved Certification Authority who is specified as the owner of the certificate. The public key, which is known to every node anyway, thus does not have to be transmitted. The validation of the certificates can be carried out in a resource-saving and efficient manner.

Except for the certification of the respective public keys, the public keys do not have to leave the respective node or the respective Sealing Software Module SSM, which makes a particularly secure operation of the network possible.

Figure 2:
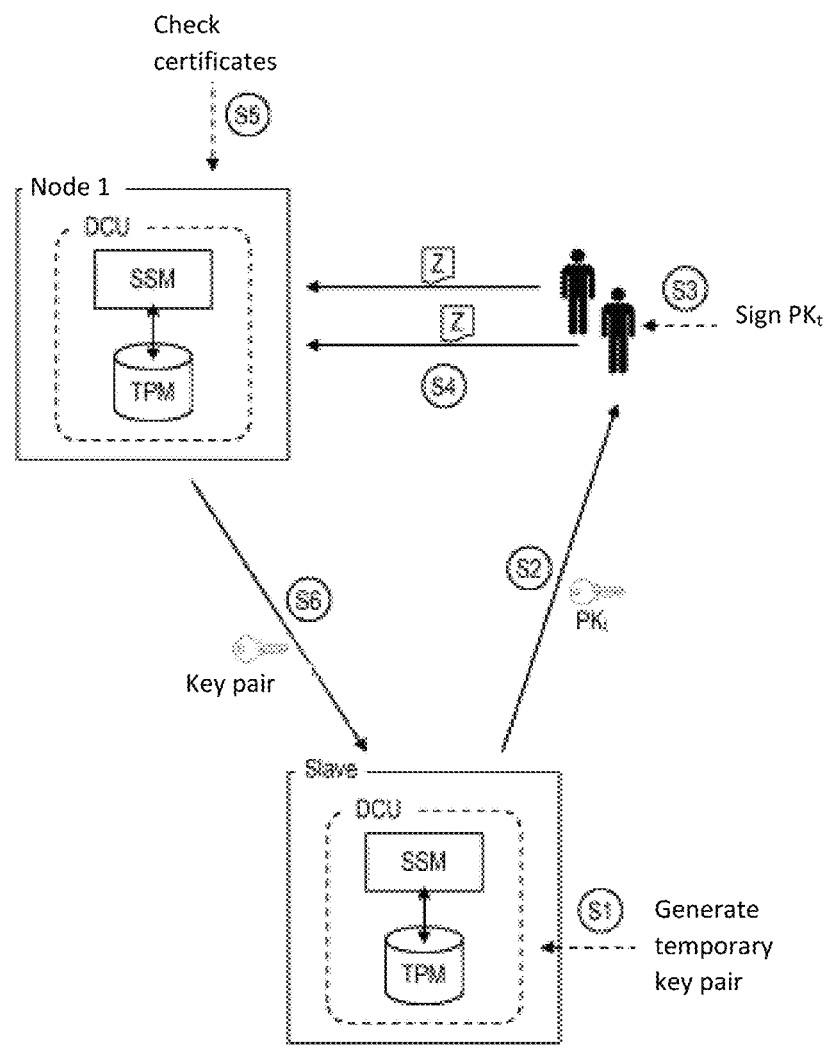
FIG. 2 is an embodiment of the method according to the invention with which the addition of a new node to a network of nodes is described.

FIG. 2 shows a block diagram with a node 1 to which another node (called slave here) is added.

Of course, a new slave node may also be added to a network that has more than one, in particular several thousand nodes.

In a first step S1, the Sealing Software Module SSM of the slave node generates a temporary cryptographic key pair. This temporary cryptographic key pair is only needed to add the node to the network and can be discarded afterwards. This temporary cryptographic key pair does not need to be generated with the secrets used to generate the key pairs of the other nodes of the network. In addition, this temporary cryptographic key pair does not necessarily have to be generated with the Sealing Software Module SSM.

In a further step S2, the public key $PK_t$ of the temporary cryptographic key pair is transmitted to a number of entities, for example a number of persons. These persons must confirm that the slave node from which they received the public key $PK_t$ of the temporary cryptographic key pair should actually be added to the network. The confirmation can be done by signing the public key $PK_t$ of the temporary cryptographic key pair with their personal key in step S3 and transmitting the signed public key $PK_t$ of the temporary cryptographic key pair as a certificate Z to the master node (which is node 1 in FIG. 2) in step S4.

The entities that confirm the public key $PK_t$ of the temporary cryptographic key pair can also be technical devices such as computers that are not part of the network or that are a part of the network.

In step S5, the master node checks the transmitted certificates Z against the respective public keys of the persons and, if the check is successful, initiates the process of adding the slave node to the network. A positive check can also require that a certain number of persons have transmitted corresponding certificates Z to the master node. For example, if the temporary public key $PK_t$ is transmitted to six people in step S1, four of the six people may need to send a corresponding certificate Z to the master node in order for the new slave node to be permanently added to the network. This is equivalent to four people agreeing to add the new node to the network.

The certificates Z transmitted in step S4 also inform the master node about the temporary public key $PK_t$ of the slave node to be added since the temporary public key $PK_t$ is part of the certificates.

If the check in step S5 was successful, i.e., if a sufficient number of persons transmitted a valid certificate Z to the master node, the master node transmits the key pair in step S6, which is required for the communication of the new slave node with the other nodes of the network, to the slave node to be added. This transmitted key pair is identical to the key pairs generated in the other nodes of the network.

The transmission of this key pair to the new slave node is encrypted, preferably by using the temporary public key $PK_t$ of the node to be added.

The new slave node stores the key pair in the Data Cleanup Area DCU or in the Trusted Platform Module of the slave node. The addition of the new slave node to the network is now complete. The temporary key pair created in step S1 can be deleted. Neither the public key nor the private key of the new node must leave the new node, especially the Data Cleanup Area DCU of the new node, for the data exchange of the new node with the other nodes of the network.

Overall, this also avoids having to distribute the public key of a node to be added to the network to all the other nodes of the network.

REFERENCE SIGNS

CA Certification Authority
TPM Trusted Platform Module
DCU Data Cleanup Area
S Secret
S1 to S6 Steps
SSM Sealing Software Module
Z Certificate (digital)
PK Public Key
$PK_t$ Temporary public key
1 to 10 Secret carriers, for example, trustworthy persons

What is claimed is:

1. A method for making a secure data exchange between a number of nodes of a network of nodes possible, wherein:
   each node is provided with at least two secrets (S) and using the respective secrets (S) and a key generation algorithm, a cryptographic key pair is automatically generated in each node,
      wherein the secrets (S) provided to the nodes and the key generation algorithm are selected such that identical cryptographic key pairs are automatically generated and wherein the generation of the cryptographic key pair takes place in a secure memory and/or processing area (DCU) of the node and at least the private key of the cryptographic key pair is exclusively stored in the secure memory area,
      wherein the secure memory and/or processing area (DCU) is designed in such a way that it only contains volatile memory media,
      wherein the generation of the cryptographic key pair is performed by a software module (SSM) that is executed in the secure memory and/or processing area,
      wherein the cryptographic key pair is deleted in the event of unauthorized access to the secure memory and/or processing area (DCU),
      wherein the at least two secrets (S) are generated by a master node, and
      wherein the at least two secrets (S) each are provided to the nodes by a trustworthy entity, and wherein each of the nodes, using the respective secrets (S) provided, generates a master secret with which the cryptographic key pairs are generated, with the secrets (S) being generated by the master node in such a way that the master secret can be generated from different but equally large subsets of the secrets (S).

2. The method of claim 1, wherein the trustworthy entities are persons.

3. A method for adding a node to a network of nodes, configured according to claim 1,
   with the node to be added (slave) generating a temporary cryptographic key pair,
   with the public key ($PK_t$) of the temporary cryptographic key pair being signed by a number of entities, each signing being performed with a private key assigned to the respective entity,
   with at least a predetermined number of the certificates (Z) generated by the signing being transmitted to a master node of the network and
   with the master node checking the received certificates and, if the check is successful, transmitting a second cryptographic key pair generated in the master node to the node to be added.

4. The method of claim 3, wherein the second cryptographic key pair is encrypted with the temporary public key ($PK_t$) prior to the transmission.

5. The method of claim 3, wherein it is determined during the certificate check whether the certificates received are verifiable and whether at least a predetermined number of verifiable certificates has been transmitted.

6. The method of claim 3, wherein the second cryptographic key pair can be used to handle an encrypted data exchange between the node to be added and the other nodes of the network.

* * * * *